Sept. 3, 1963     F. G. REUTER ETAL     3,102,744
BALL AND SOCKET JOINT

Filed March 23, 1960

INVENTORS
FRANZ GOTTFRIED REUTER
JÜRGEN ULDERUP
BY

ATTORNEY

United States Patent Office 3,102,744
Patented Sept. 3, 1963

3,102,744
BALL AND SOCKET JOINT
Franz G. Reuter and Jürgen Ulderup, Lemforde, Germany, assignors, by mesne assignments, to Mobay Chemical Company, Pittsburgh, Pa., a corporation of Delaware
Filed Mar. 23, 1960, Ser. No. 17,069
Claims priority, application Germany Mar. 26, 1959
6 Claims. (Cl. 287—87)

This invention relates generally to ball and socket joints adapted for use in the steering mechanism of a vehicle and more particularly to an improved ball and socket joint having a resinous liner between the ball and socket.

It has been proposed heretofore to provide ball and socket joints with a separate resinous liner (i.e. nonadherent liner) between the ball and socket. The purpose of these separate liners is to provide an elastic bearing surface for the ball of the king pin which absorbs shock transmitted from the wheels to the joint as the wheels pass over a road surface. Joints of this type are so flexible, however, that they introduce play into the steering mechanism. Consequently, the driver's control over the steering, or feel, is impaired and the road stability of the vehicle is jeopardized because a wheel held by the tie rod in an elastic joint does not track as faultlessly as one which is positioned by a joint entirely free of play.

It is therefore an object of the invention to provide an improved ball and socket joint. Another object of the invention is to provide a ball and socket joint having a resinous separator which is devoid of the disadvantages inherent in the prior joints of this type.

Other objects will become apparent from the following description with reference to the accompanying drawing in which.

Figure 1:
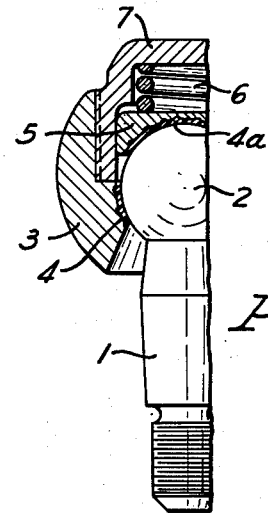
FIGURE 1 is a longitudinal fragmentary section of one embodiment of the invention.

The foregoing objects and others are accomplished in accordance with this invention, generally speaking, by providing a ball and socket joint having a king pin terminating in a spherical head positioned in a bearing housing having an adherent coating of an abrasion resistant synthetic resin which lies between the housing and spherical head. It has been found that it is not necesasry for a ball joint to have elastic bearing surfaces. A relative thin adherent coating of a synthetic resin has been found to dampen vibrations. The invention thus provides the ball joint housing with an adherent, thin, synthetic resinous coating which acts as a low friction bearing surface. The thin, synthetic resinous coating dampens the vibrations ordinarily transmitted in a steering mechanism without producing any play therein. The thickness of the coating can be varied depending upon the weight of the vehicle and the type thereof. For example, the coating on a ball joint used in trucks will be thicker than one used in a ball joint used for the steering mechanism of a passenger vehicle. As a general rule, however, it is preferred that the thickness of the coating be from about 0.001 inch to about 0.05 inch but any thickness which will effect dampening without introducing play in the steering mechanism may be used.

In one embodiment of the invention, the housing is provided with a rigid bearing cup which lies against the upper surface of the spherical head. In this embodiment, the coating is applied to the housing adjacent the base of the sphere and on the bearing cup adjacent the top portion of the sphere.

The coating can be applied to the inner wall of the housing and to the bearing cup by any suitable means, such as, for example, by spraying or brushing a solution of the synthetic resin over the surface thereof and permitting the solvent in the solution to evaporate. The synthetic resin may be a polyester, a polycarbonate, a polyamide, a polytetrafluoromethane or similar abrasion resistant resin. However, best results are obtained with a polyurethane elastomer so it is preferred to use this resin for lining the housing and the bearing cup. The solution may contain the resin dissolved in any suitable inert solvent therefor such as, for example, ethyl acetate, acetone, mineral spirits, dimethyl formamide, or the like. The polyurethane coating can be applied by reacting the chemicals in a solvent therefor after the coating has been applied. Any suitable polyester such as one prepared by esterifying a polycarboxylic acid and a polyhydric alcohol may be used. Such polyesters or alkyd resins are known in the art. The polycarbonate may be prepared in accordance with the process disclosed in Canadian Patent 578,585, granted June 30, 1959. Polyamides are known in the trade as "Nylon" and any such resin may be used. The polyurethane elastomer may be prepared in accordance with the process disclosed in Reissue Patent 24,514 (2,729,618) or by any other suitable process from a polyalkylene ether glycol or a polyester. Preferably, the polyurethane elastomer should have a Shore A hardness of from about 80 to about 98°. Any of these synthetic materials have sufficient dampening properties, strength and abrasion resistance to perform satisfactorily as a coating in a ball and socket joint. The synthetic resin can be further improved by incorporating particles of molybdenum disulfide therein. The molybdenum disulfide should preferably have a cross-sectional dimension of from about 0.002 millimeter to about 0.02 millimeter. It is advantageous to include a silicone oil or a suitable liquid hydrocarbon along with the molybdenum disulfide. Any suitable liquid organo siloxane may be used as the silicone oil. Preferably, the silicone oil should have a viscosity of from about 50 to 500 centistokes at 20° C. Preferably, from about 0.01 percent to about 5 percent by weight, based on the weight of the resin, of the molybdenum disulfide should be used. Preferably, from about 0.01 percent to about 5 percent by weight silicone oil or hydrocarbon should be used.

The rigid bearing cup used in some embodiments of the invention can be one of conventional design. However, it is not necessary to machine the bearing cup to as close tolerances when using the coating as it has been heretofore. Because a greater tolerance is permissible, it is possible to use bearing cups made by sintering, pressing or casting without any subsequent machine operations. In fact, it is advantageous not to machine the surface which is to have the synthetic resinous coating because adhesion of the coating is better on the unmachined surface that it is on a machined surface.

In another embodiment of the invention, which is a preferred embodiment because it is more efficient in dampening noises and vibrations, a woven core of a suitable textile is placed on the surface of the housing or bearing cup and the synthetic resinous coating is applied over the core. This core may be of any suitable textile such as a polyamide fiber, cotton or the like. The core improves the strength of the coating and prevents disadvantageous elasticity of the coating.

Referring now to the drawing for a more detail description of the invention, FIG. 1 illustrates one embodiment in which king pin 1 terminates in a spherical head 2 which is positioned inside a bearing housing 3. A coating of polyurethane elastomer 4 adheres to the lower part of the housing. Coating 4 has been applied to the surface of the housing by spraying, brushing, casting or similar process. Spherical head 2 is supported by a metal bearing cup 5 in the upper half of the housing 3. Bearing cup 5 has a surface of the type obtained when it is formed without machining such as by pressing, casting, or a sintering operation. Coating 4a of polyurethane elastomer adheres to the inner surface of bearing cup 5. A compression spring 6 holds bearing cup 5 in position in the conventional manner. Both compression spring 6 bearing cup 5 are located and secured inside a lid 7 which is threadably mounted on housing 3.

Figure 2:
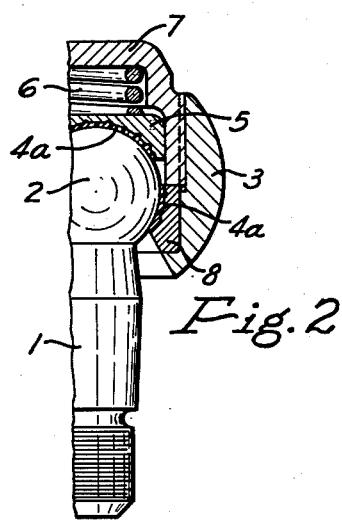
FIGURE 2 is a longitudinal fragmentary section of another embodiment of the invention.

The embodiment shown in FIG. 2 is a ball joint generally similar to the one illustrated in FIG. 1. King pin 1 has its spherical head 2 positioned inside a housing 3. A bearing cup 5 having a coating of polyurethane elastomer 4a lies in the upper part of the housing. The lower part of housing 3 has a bearing cup 8 which is coated with a polyurethane elastomer 4a. Bearing cup 8 and bearing cup 5 are similar in design and either or both can be made by sintering or other process.

Figure 3:
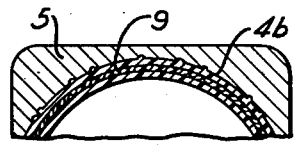
FIGURE 3 is a section through an embodiment of a bearing cup for use in a joint provided as an embodiment of this invention.

A bearing cup is illustrated in FIG. 3 which is provided with a thick coating of a synthetic resin. A coating of this type may be required when a resin such as tetrafluoroethylene is used. Coating 4b on bearing cup 5 has embedded therein a woven cloth core 9. Reinforcing textile core 9 increases the strength and rigidity of the coating.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A ball and socket joint having a housing having a socket and a ball positioned in the socket, a thin self-adhering coating comprising a substantially non-porous polyurethane elastomer having particles of a solid lubricant embedded therein and having a Shore A hardness of from about 80 to about 98 on the inner wall of the socket and adjacent the ball.

2. The assembly of claim 1 wherein the coating is on a bearing cup which forms a wall of the socket.

3. The assembly of claim 2 wherein the bearing cup is made from sintered metal.

4. A ball and socket joint having a socket and a ball positioned in the socket, a self-adhering coating comprising a substantially non-porous polyurethane elastomer containing molybdenum disulfide, silicone oil and a hydrocarbon on the inner wall of the socket and adjacent the ball.

5. In a method for making a ball and socket joint, the improvement of which comprises coating at least part of the inner wall of the socket with a self-adhering coating comprising a substantially non-porous polyurethane elastomer containing molybdenum disulfide, silicone oil and a hydrocarbon.

6. A ball and socket joint having a housing having a socket and ball positioned in the socket, a thin self-adhering coating comprising a substantially nonporous polyurethane elastomer having particles of molybdenum disulfide embedded therein and having a Shore A hardness of from about 80 to about 98 on the inner wall of the socket and adjacent to the ball.

References Cited in the file of this patent

UNITED STATES PATENTS

| | | |
|---|---|---|
| 2,424,883 | Habgood et al. | July 29, 1947 |
| 2,828,236 | West | Mar. 25, 1958 |
| 2,838,436 | Clingman | June 10, 1958 |

FOREIGN PATENTS

| | | |
|---|---|---|
| 719,312 | Great Britain | Dec. 1, 1954 |
| 757,582 | Great Britain | Sept. 19, 1956 |

OTHER REFERENCES

The publication "Polyurethanes" by Bernard A. Dombrow copyright 1957, by Reinhold Pub. Corp.; New York, N.Y.